(No Model.) 4 Sheets—Sheet 1.
G. W. HEY & E. LAASS.
MAIL STAMPING APPARATUS.
No. 356,406. Patented Jan. 18, 1887.
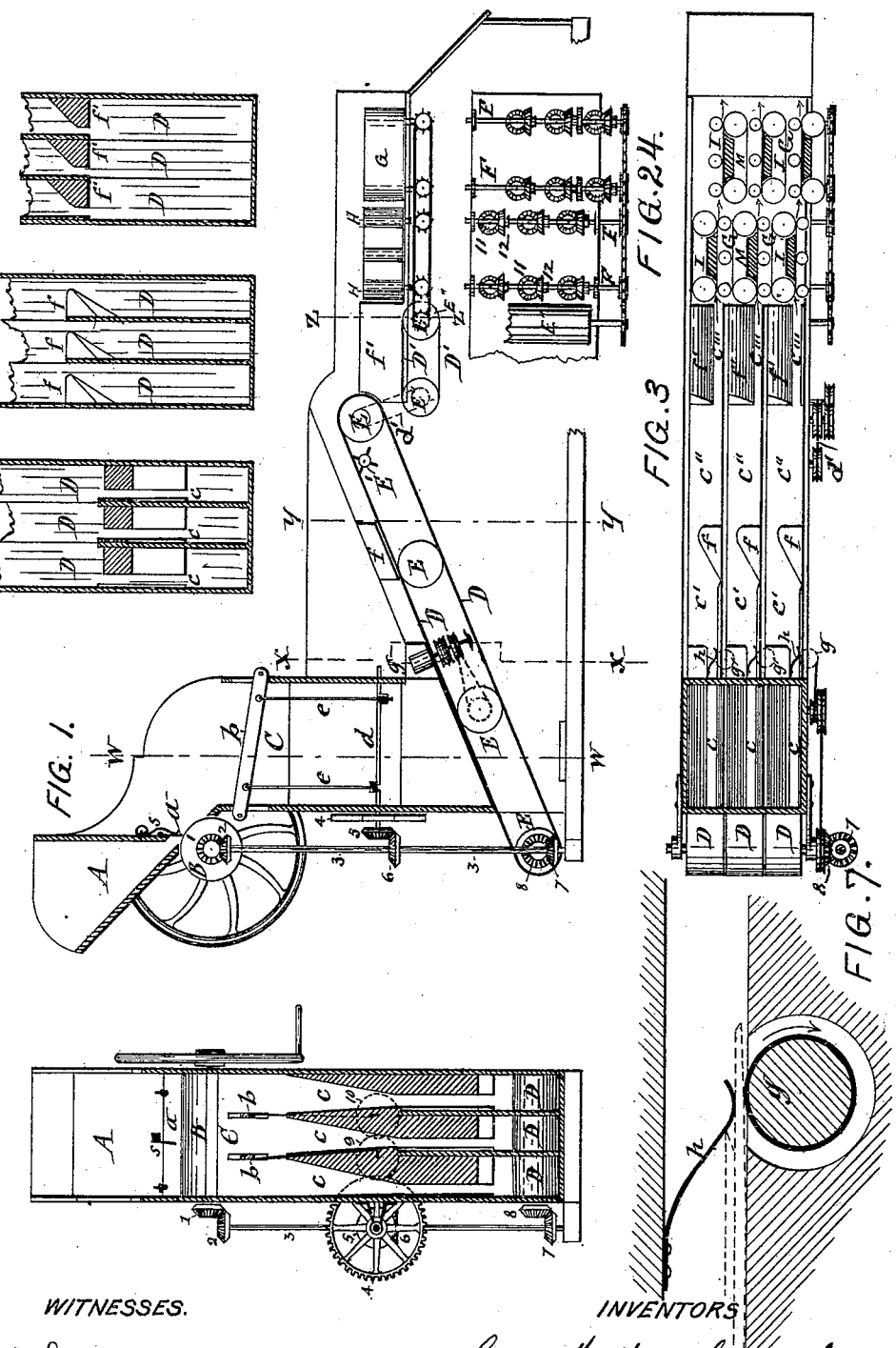
WITNESSES.
INVENTORS (No Model.) 4 Sheets—Sheet 2.
G. W. HEY & E. LAASS.
MAIL STAMPING APPARATUS.
No. 356,406. Patented Jan. 18, 1887.
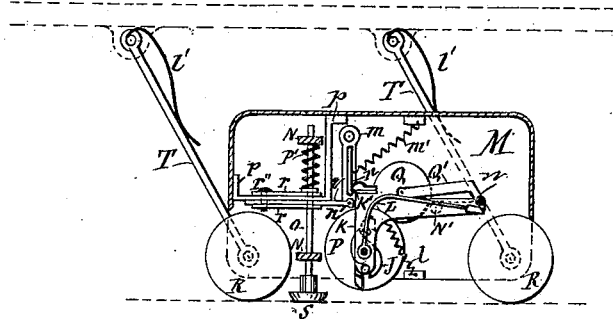
FIG-8.
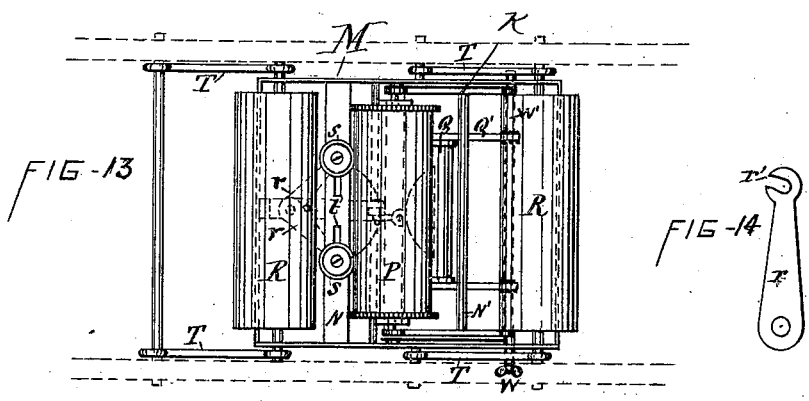
FIG-13.
FIG-14.
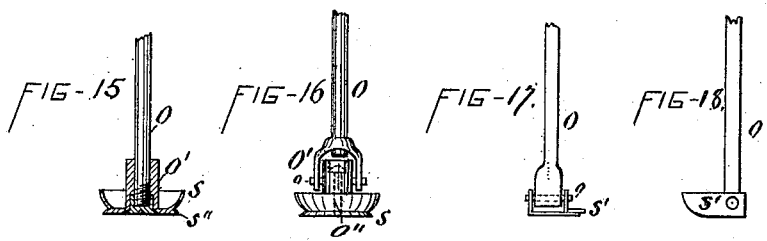
FIG-15. FIG-16. FIG-17. FIG-18.
WITNESSES
F. H. Gibbs
Cow. C. Raymond
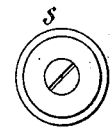
FIG-19.
INVENTORS:
George W. Hey
and Emil Laass
per Duell, Laass & Hey, Atty.

(No Model.) 4 Sheets—Sheet 3.
G. W. HEY & E. LAASS.
MAIL STAMPING APPARATUS.
No. 356,406. Patented Jan. 18, 1887.
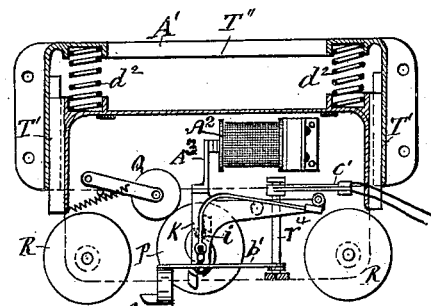
FIG. 9
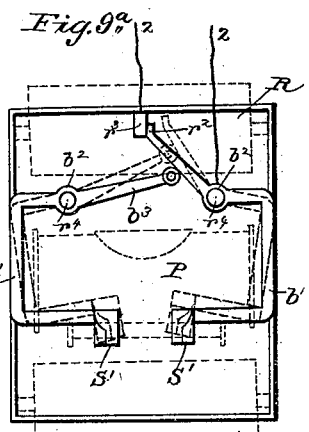
Fig. 9ª
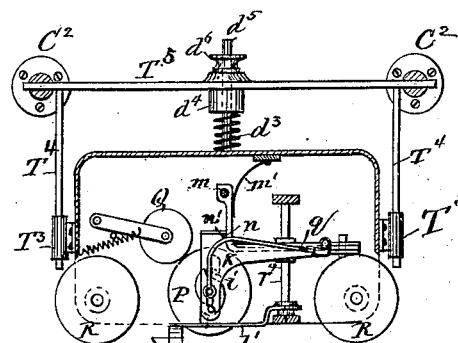
FIG. 11
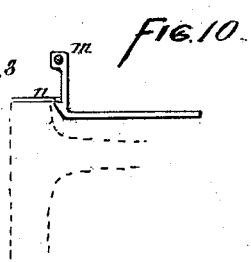
FIG. 10
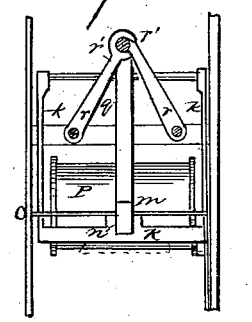
FIG. 25
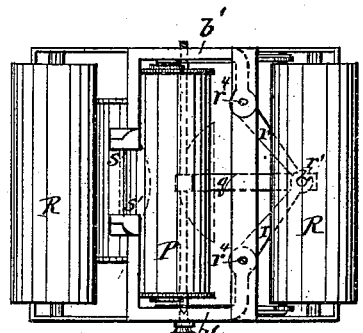
FIG. 12
WITNESSES
C. H. Drull
Wm. C. Raymond
INVENTORS
George W. Hey
and Emil Laass
per Drull, Laass & Hey
Attys (No Model.) 4 Sheets—Sheet 4.

G. W. HEY & E. LAASS.
MAIL STAMPING APPARATUS.

No. 356,406. Patented Jan. 18, 1887.

WITNESSES
C. H. Duell
Wm. E. Raymond

INVENTORS:
George W. Hey & Emil Laass
per Duell, Laass & Hey
Atty

N. PETERS, Photo-Lithographer, Washington, D. C.

UNITED STATES PATENT OFFICE.

GEORGE W. HEY AND EMIL LAASS, OF SYRACUSE, NEW YORK.

MAIL-STAMPING APPARATUS.

SPECIFICATION forming part of Letters Patent No. 356,406, dated January 18, 1887.

Application filed February 25, 1885. Renewed November 5, 1886. Serial No. 218,072. (No model.)

*To all whom it may concern:*

Be it known that we, GEORGE W. HEY and EMIL LAASS, citizens of the United States, and residents of Syracuse, county of Onondaga, and State of New York, have invented new and useful Improvements in Mail-Stamping Apparatus, of which the following is a specification.

Our invention consists in an automatic marking-machine, and has for its object the production of an apparatus in which the letters may be thrown directly from the mail-bag into a receptacle, and then by suitable mechanism therein separated and arranged and propelled consecutively to a stamping mechanism, and the usual postmarks applied, with no other manual labor excepting that necessary to actuate the machine. The stamping mechanism is of the character described in our applications for Letters Patent filed, respectively, on February 26, 1884, and June 2, 1884—*i. e.*, in automatically finding the desired part of the letter upon which to impress the postmark.

To this end, then, it consists in a letter receptacle or hopper, into which the letters may be thrown without prearrangement and therein subjected to the action of separators, which divert the letters into converging channels, where they are received upon moving inclined belts arranged in and on a supporting bed or trough, where additional separators are placed, so that the letters are caused to pass consecutively to the marking apparatus.

It consists, also, in the detail construction and arrangement of the mechanism for separating the letters and feeding them to the markers, and also in the detail construction of the supporting or bearing surfaces which sustain the letters during the marking operation, and also in the detail construction of the marking apparatus, all of which will be more fully and specifically set forth, and pointed out in the claims.

In specifying our invention reference is had to the accompanying drawings, forming a part hereof, like letters indicating corresponding parts in all the figures, in which—

Figure 1 is a longitudinal vertical section showing the letter receptacle or hopper, the shakers and separators, the inclined belt, and the supporting-bed for the marking mechanism. Fig. 2 is a transverse vertical section on line *w w*, Fig. 1. Fig. 3 is a top plan view, partly in section, showing the separating and letter-turning mechanism and the marking mechanism arranged in series. Fig. 4 is a transverse vertical section on line *x x*, showing the exit from converging channels on the inclined letter-belt. Fig. 5 is a transverse vertical section on line *y y*, showing the devices in the channels for turning the letters flatwise in the process of separating. Fig. 6 is a transverse vertical section on line *z z*, showing the device for turning the letters upon their edges in the process of separating them. Fig. 7 is an enlarged longitudinal section of the secondary separating devices, and shown in rear of line *x x*, Figs. 1 and 3. Fig. 8 is a longitudinal vertical section of a marking device, showing the arrangement of the various parts and one form of yielding support for attaching the marker to the supporting-bed of the feed. Fig. 9 shows a modification of the construction of the marker, also in section. Fig. 9$^a$ is a plan view of the electric switch and connections shown in Fig. 9. Fig. 10 is a detached detail of the catch for retaining the roller-frame. Fig. 11 is a longitudinal section of the further modification of the marking-machine. Fig. 12 is an inverted plan view of Fig. 11, showing the arrangement of the devices for releasing the marking-roller. Fig. 25 is a plan of the parts represented in these views. Fig. 13 shows an inverted plan view of Fig. 8. Fig. 14 is a detached detail of the releasing-arms used in illustration for Figs. 8 and 13. Fig. 15 is a detached detail of the catch finger or feeler shown in Figs. 8 and 13. Figs. 16, 17, 18, and 19 are detached details of the catch finger or feeler, showing modifications in the construction of the same. Fig. 20 is an enlarged detail of construction of the letter-separating surface next to the marker, showing the detailed construction of the adjustable bearing. Fig. 21 shows a longitudinal vertical section of a modified construction of the automatic marker. Fig. 22 is a top plan of the same. Fig. 23 is a transverse section taken on line *x x* in Fig. 21; and Fig. 24 is an inverted plan view showing the mechanism for operating the letter-propelling rollers of the marking-machines.

The letter A represents the hopper or letter-receptacle, which is constructed with inclined side or sides, so as to deliver the letters on the roller B. The roller B is faced with soft rubber, and is supported with its periphery projecting slightly in beyond the inclined side of the receiving-hopper and against the pivoted gate $a$. The gate $a$ is yieldingly sustained on the roller B by a spring, $s$. The shaft of the roller B is provided with miter-gear 1, which meshes with a gear, 2, on the end of a vertical shaft, 3, Figs. 1, 2, and 3, said miter-gear transmitting motion to the shaft 3, which in turn transmits motion to the crank-shaft $d$, Fig. 1, through the medium of the gears 4, 5, 6, 9, and 10, and the crank-shaft $d$ transmits a vertical movement to the shakers $b\ b$, sustained in the primary channel or receptacle C, which is beneath the hopper A, by means of the connecting-rods $e\ e$. Now, as the letters fall down the inclined side of the hopper they are taken on the rubber face of the roller B and forced past the gate $a$, and delivered on the shakers $b\ b$, and thereby diverted into the converging channels $c\ c\ c$, Fig. 2, formed in the primary channel C, and the letters are delivered through the channel C upon an endless belt, D D, which passes through the primary channel C and the letter-supporting trough or bed in an inclined plane, as shown in Fig. 1.

E E E E are the rollers on which the belts D D D revolve, and said belts are actuated by the miter-gears 7 and 8 on the shaft 3. The partial separation of the letters is effected by the passage of the letters from the hopper A through the primary channel C and its converging channels by the action of the roller B and the shakers $b\ b$, and as the letters ride up the incline on the belt D they come in contact with the spring-fingers $h$, Fig. 3, which press them against the rubber-faced rollers $g$, Fig. 7, which prevents more than one at a time passing from the converging channels $c$ into the channels $c'$. The letters are delivered edgewise on the belts D by reason of the shape of the converging channels $c\ c$. Beveled shelves $f$ are provided in the channels $c'$, against which the letters come in contact and are thrown flatwise on the belt. In this position they are carried through the channel $c''$, which is simply a continuation of $c$ and $c'$, where they pass over a shaker, E', Fig. 1, which is a further provision to insure the perfect separation of the letters as they move up on the inclined belt.

The contour of the beveled shelves $f$ is shown in Fig. 5. At the end of the channel $c''$ farthest from the hopper is placed a slanting shelf, $f'$, which narrows the channel $c''$ into the channel $c'''$, which causes the letters to fall edgewise upon the belt D', which moves in a horizontal plane. This last operation arranges the letters in position to pass into the marking appliances, which are arranged in close proximity to the end of the channel $c'''$. The rubber-faced rollers $g$ are driven by belts $g'$ from the rollers E, and the belt D' D' is driven by a belt, $d'$, from the roller E, Fig. 1. The roller E'' is provided with a sprocket-wheel, which drives the shaft F, Figs. 1 and 24, by an endless chain belt passing over a similar sprocket-wheel on said shaft, and said shaft, by means of miter-gears 11 12, and so on, transmits motion to rollers H, driving the belts G. These belts G are arranged over letter-supporting surfaces I, Fig. 3, arranged transversely in relation to each other, for the purpose of exposing the opposite sides of the letter moving in a straight line in direction of the arrows in Fig. 3 to the action of the alternately-arranged marking-machines M M, for the purpose of applying the mark upon the desired side of the letter, and the belts G G take the letter as it issues from the channel $c'''$ and force it past the yieldingly-supported markers M, which will be presently described.

We do not limit ourselves to the precise construction of the apparatus described, as the exemplification herein illustrated and described is simply intended as a desirable form of mechanism through which our invention, or at least the receiving and separating portion or feed, may be carried out and practiced; but it is obvious that all of the mechanical movements are susceptible of modifications, and we consider our invention to be broader than mere detail of construction, the essentials to the successful operation consisting in providing the receiving-hopper and primary channel with separating mechanism and conveyers upon which the letters can be arranged and propelled consecutively to the automatic marking appliance.

In the herein-illustrated example of our invention the feeding and separating mechanisms are shown arranged in series, the object of which is to increase the capacity, and it is of great advantage to the invention to arrange the appliances in the manner shown. The capacity can be further increased by simply widening the parts, so as to provide more letter-channels and more series of marking-machines, the idea being that if a machine constructed with a single channel and one set of marking appliances will separate, arrange, and mark, say, five hundred letters per minute the capacity will be increased or multiplied by simply adding more channels and more series of marking-machines, as in the example herein shown. Such additions, however, simply constitute a duplication of the various parts, together with suitable arrangements of the gearing and driving mechanism to actuate the devices.

The automatic markers employed in our invention are of the same character as those described in our previous applications before referred to, and may vary considerably also in detail of construction. Our preferred plan, however, is illustrated in Figs. 8 and 13.

The marker is designated by the letter M, and it consists in a frame having guide-rollers R R extending across at each end thereof, as shown in the inverted plan view, Fig. 13. Within the frame is pivoted a roller, P, provided with marking-dies upon its periphery, said printing-roller being provided with cams upon its flanged disks, said cams being indicated by J, and said roller is sustained in a slotted yoke, K. A pin, $i$, in the yoke riding against the cam J causes the roller to be pressed upon the letter when released by the passing envelope, as fully described in our application for patent filed June 2, 1884, and a spring, L, connected with the journal of the roller P at one end, the other end secured to the yoke K, serves to retract the roller P to its normal position out of contact with the passing letter after the impression has been made.

The salient elements of difference in the construction of the marker herein shown and that described in our application of June 2, 1884, is found in the detail arrangement of the parts and the construction thereof. In the herein-illustrated marker the yoke K is provided with a catch, $n'$, which takes on the spring-hook $n$, secured to the pivoted bar $m$, and a draw-bar, $q$, connected to the pivoted bar $m$, serves to withdraw the hook $n$ from engagement with the catch $n'$ when pressure is applied to the draw-bar $q$ by the engagement of the catching-feelers S. In order to guide the draw-bar $q$ in a horizontal plane, thereby securing a quick and freely-working action to the draw-bar $q$, we provide an angle-bar, $p$, secured to the frame, as shown in Fig. 8, so as to prevent the bar $q$ from tilting upward in its operative movement. This angle-bar $p$ is provided with a small slot, through which a pin, $r''$, passes, connecting the hook-arms $r$ to the draw-bar $q$, as shown best in the inverted plan view, Fig. 13. The slot in the angle-bar $p$ permits the rectilinear movement of the draw-bar, and the hooked ends $r'$ of the arms $r$ are connected with the bars O of the catching fingers or feelers.

It will be observed upon inspection of the inverted plan view, Fig. 13, that the bars O of the catching-fingers S pass through slots in the cross-bar N, and are connected by the hooked arms $r\ r'$ with the draw-bar $q$, and that therefore when the catching-fingers S are moved toward each other in the slots $t\ t$ the hooked arms $r\ r'$ move the draw-bar $q$, and with it the pivoted bar $m$ and its hooked end $n$, releasing the yoke K, permitting it to be forced to the passing letter, and the spring $m'$ serves to retract the pivoted bar $m$ to its normal position, carrying with it the other parts which are connected with it in the manner described.

The roller-yoke K is forced onto the advancing letter by the spiral $l$, Fig. 8. An inking-roller, Q, sustained in a yoke-frame, Q', is pivoted to the shaft W', which serves also to pivot the yoke K in the marker-frame, and said inking-roller Q supplies ink to the marking-dies mounted on the printing-roller P. The outer end of the shaft W' is provided with a thumb-screw, W, and the inner end with a thread, which enters a socket in the frame, so that when it is desired to remove the printing-roller and its yoke it is only necessary to unscrew the shaft W' by turning the thumb-screw W. It is to be understood that the steel catching-hook $n$ on the pivoted bar $m$ is released from the catch $n'$ by the engagement of the catching fingers or feelers S with the overlapping edges of the envelope of the passing letter, as fully described in our aforesaid application of June 2, 1884.

The catching finger or feeler which experience shows to be the best form is illustrated in section at Fig. 15. It consists of a metal saucer-shaped button with a sharpened edge, S'', and an elongated sleeve, O', through which the supporting-shaft O passes. The sleeve O' affords a long bearing on the shaft O, permitting the catching-finger S to revolve freely on the shaft O. The catching-finger is retained on the shaft by a screw-connection with the shaft O, as shown in the sectional view, Fig. 15.

Fig. 19 shows the bottom plan of the catching-finger.

Fig. 16 is a modification of the attachment of the shaft O to the sleeve O', and consists simply in providing the sleeve O' with trunnions $o$, and connecting the shaft with a forked yoke sitting over the trunnions, whereby the catching-finger S is permitted to tilt on the shaft O while it revolves on the supplemental shaft or connection O''.

Figure 20:
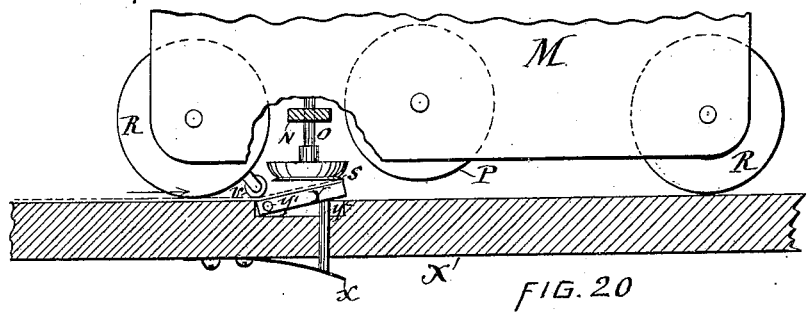

The modification of the catching finger or feeler S indicated by S' in Figs. 17 and 18 can be substituted for the revolving catching finger or feeler in the construction shown in Figs. 8 and 13 without changing any of the other mechanical elements. The construction of the catching finger or feeler in said modification is substantially the same as that described in our application of June 2, 1884.

In order to connect the markers M to the supporting-bed of the separating and feeding mechanism so that letters of different thicknesses may be operated upon by the marker, we provide a yielding support, which may consist of parallel bars T T, Figs. 8 and 13. These are connected, as shown, to the supporting-bed and to the axles of the guide-rollers R R, and springs $l\ l'$ serve to yieldingly sustain the marker against the supporting-bed.

In Fig. 9, at T' T'', is shown another form of yielding support for the marker. In this case a frame, A', is provided with recessed guides T', by which it slides on guide-ribs attached to a stationary supporting-frame, A', while spiral springs $d^2$ serve to cushion the marking-frame yieldingly against the letter-supporting surface. The preferable plan of constructing the yielding support, however, is illustrated at Fig. 11. In this form guides $T^3$ are secured to the ends of the marking-frame, through which pass the bars $T^4$. These are secured to the cross bar $T^5$, mounted on posts C'', secured to the letter-supporting bed. A central slide, $d^5$, passes through the elongated bearing $d^4$ in the cross-bar $T^5$, and through a spiral spring, $d^3$, interposed between the marking-frame and cross-bar. A thumb-screw, $d^6$, serves to tension the spiral spring $d^3$.

The essential requisites of the yielding attachment of the marking-frame are, that the marker shall be firmly held up to the passing letter and yet yield freely for the different thicknesses of letters, in order that the letters may pass through rapidly without clogging.

The markers are arranged against vertical supporting-surfaces on the letter-bed on opposite sides of a rectilineal line, as shown in Fig. 3, two markers being arranged transversely in relation to each other on opposite sides of said line, so that a letter passing between the markers exposes its opposite sides alternately. In this case our automatic marking-machine is for the purpose of applying the received mark to the backs of the envelopes, and, as before stated, the markers are actuated by the contact of the catching fingers or feelers S with the overlapping edges of the envelopes. In order to insure the engagement of the catching-fingers with said edges of the letters, we apply a spiral, $p'$, to the shaft O of the catching-fingers, said spiral exerting a downward pressure on the finger or feeler, and the catching-finger S is made to rest against the pivoted bed-piece Y, Fig. 20. This pivoted piece Y is mounted in a recess in the vertical letter-supporting surface X, as shown in said Fig. 20. A stud, $y$, protruding through said surface X forces the pivoted piece Y against the catching-finger by a spring, $x$, secured to the outer side of the surface X. By this means the catching-finger S is held clear of the path of the advancing letter, and at its forward end a contact therewith insured, as the letter must displace the pivoted piece Y in order to pass along over the supporting-surface.

We provide a guide-roller, $v$, Fig. 20, to prevent the advancing edge of the letter from colliding with the side of the catching-finger and to guide the same underneath the catching-finger, as clearly shown in said Fig. 20.

In Fig. 9 is illustrated a modified construction of the marker, in which an electrical magnet, $A^2$, and an armature, $A^3$, with an electric switch, $C'$, are employed to release the yoke K and the printing-roller P. In this construction the inking-roller Q is located in front of the printing-roller P, and the catching-fingers S' are connected with bars $b'$, as clearly shown in said Fig. 9. In this case the armature $A^2$ is held in contact with the magnet $A'$, such devices forming the supporting-catch, taking the place of $n$ $n'$ in Fig. 11. It must be understood that this construction is operated by a closed circuit, the construction of which is illustrated in the plan view, Fig. 9$^a$, the switch $C'$ being composed of the block $r^3$, secured to the supporting-frame of the marker, and the movable arms $r^2$ $b^3$ being secured to the journaled spindles $r^4$ $r^4$, $b^3$ having a friction-roller bearing on $r^2$, and serving to push $r^2$ off of the block $r^3$ when the feeler S' engages the letter-flap. It will be observed that the poles of the circuit are composed of $r^2$ $r^3$, and that they are normally in contact with each other. When the feelers S S', or either of them, engage with the letter-flaps, the circuit is broken by the separation of the poles $r^2$ $r^3$ and the marking-roller released and forced on the letter. Immediately when the feelers are released from the letter the switch blocks or poles are forced together by suitable springs, closing the circuit, and the magnet and armature react the marking-roller when the cam and stud-pin force the roller-yoke to the magnet.

In Fig. 11 a further modification in the construction of the marker is shown. In this case the electric switch, magnet, and armature are dispensed with and a pivoted bar, $m$, substituted, said bar $m$ being provided with a catch-hook, $n$, as best shown in Fig. 10, said catch $n$ engaging with a catch, $n'$, formed on the roller-yoke K. The mechanism for withdrawing the swinging bar $m$ is very similar to that shown in Fig. 8, heretofore described, differing chiefly in having the catching-fingers S' mounted on a flat spring which is secured to the pivoted bars $b'$; and an inverted plan view of this construction is illustrated at Fig. 12, in which the bars $b'$ $b'$ are shown connected to journaled spindles $r^4$, Fig. 11, at the lower ends of said spindles $r^4$, said spindles $r^4$ serving as pivots upon which bars $b'$ $b'$ turn when the feelers engage the letter-flaps. The arms $r$ are secured to the opposite or upper ends of spindles $r^4$ and turn with the arms $b'$, and since the arms $r$ are connected to the draw-bar $q$, Fig. 10, they transmit the movement of the feelers to the said draw-bar, which movement withdraws the catch $n$ from the shoulder $n'$ of the marking-roller yoke, and the yoke is forced upon the letter by the springs, as in the foregoing-described constructions.

Figure 21:
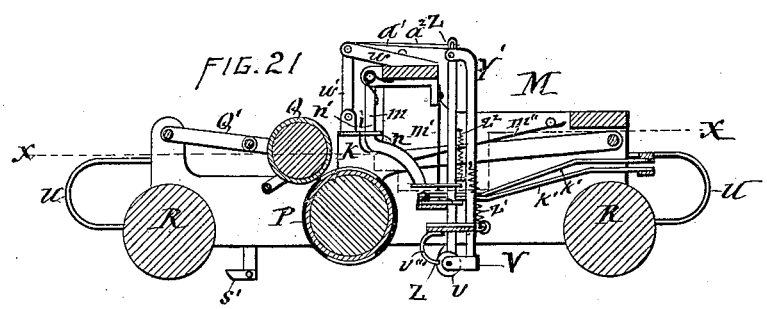
Figure 22:
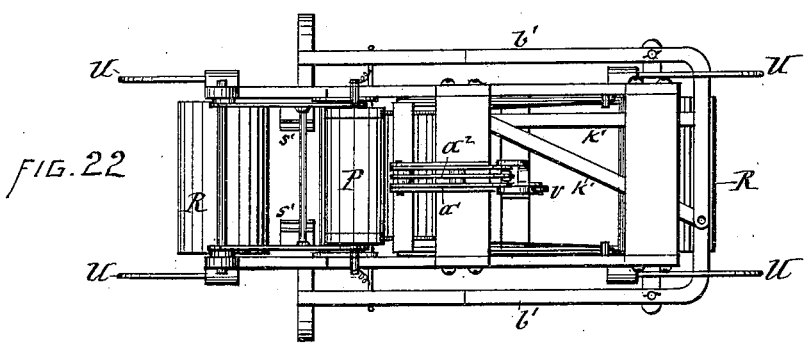
Figure 23:
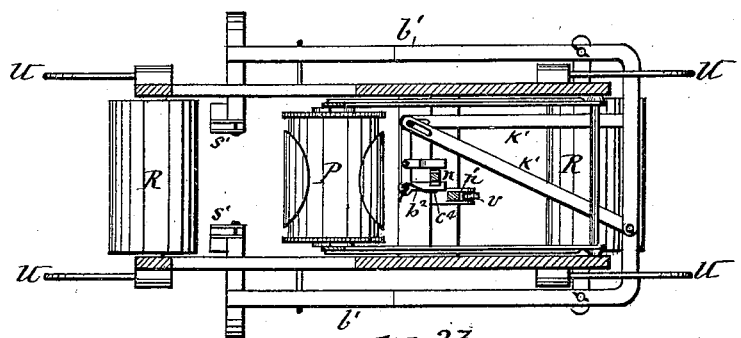

Fig. 21 illustrates a further modification in the construction of the marker. In this case the printing-roller yoke is released by the contact of the advancing edge of the letter with a catching-finger, Z. The action of this finger is controlled by the engagement of the catching-feeler S' with the lapping edges of the envelope, as heretofore described, said engagement actuating the trigger $b^2$, (shown in the sectional view, Fig. 23,) which releases the finger Z, said finger being forced by the spiral $z^2$ toward the advancing letter, which collides therewith, and forces or withdraws the catch $n$ from engagement with the catch $n'$ on the yoke K, said catch $n$ being formed on the pivoted bar $m$, which is provided on its lower extremity with a slotted extension, the finger Z passing through said slotted extension. In order to guide the advancing letter to the catch-finger Z we provide a yoke attachment, Y', connected at its upper end with the rocker $a''$ and the finger Z, and at its lower extremity with a yoke-frame, V, having journaled therein a small roller, v. This roller comes about midway in front of the finger, so as to straighten at the edge of the advancing letter and enable it to push against the finger Z without crumpling. A spring, $m'$, retracts the pivoted bar into engagement with the catch on the yoke of the printing-roller when said printing-roller is lifted from the letter. The finger Z is connected directly to the yoke K of the printing-roller by means of the rocker $a'$ $a^2$ and the pivoted connection $w'$. The releasing-trigger $b^2$ is provided with a flat spring, $c^4$, and is connected to the catching-feelers $S'$ by connecting-rods K' K' and the pivoted side rods, $b'$, as best shown in Figs. 22 and 23. The action of this construction is substantially similar to those illustrated and described in our application of June 2, 1884.

As has been stated heretofore, we consider our invention to consist, broadly, in an automatic marking-machine, and we do not restrict ourselves to the specific construction of the parts, as they may be widely departed from without changing or affecting the principle of our invention.

Having thus fully described our invention, what we claim as new, and desire to secure by Letters Patent, is—

1. An automatic letter-marking machine comprising a hopper or receptacle for receiving the letters, which are thrown in without pre-arrangement, a primary channel subdivided into converging channels and provided with agitators, a supporting bed or trough, in which the letters are separated, and suitable separating mechanism, whereby the letters are arranged to pass consecutively to the marking devices by suitable actuating mechanism, and a marking device for applying the desired mark to the letters, all substantially as and for the purpose set forth.

2. An apparatus for separating mail-matter, consisting of an inclined traveling belt carrying the mail-matter upward on the incline and a shaker shaking the belt to cause the superincumbent mail-matter to slide down from the upward-traveling mail-matter, substantially as specified.

3. The combination, with the letter-conveyer, of a series of guide-channels successively arranged to allow the letters to turn from an edgewise to a flatwise position.

4. The combination, with the letter-conveyer, of a series of guide-channels, arranged as described, and tripping devices in said channel to turn the letters from an edgewise to a flatwise position, as set forth.

5. A letter-separating apparatus comprising a chute, separate channels under said chute, and letter-agitators over the channels.

6. In a letter-separating apparatus, the combination of a hopper, a chute communicating with said hopper, a feed-gage between the hopper and chute, and separate channels under the chute.

7. In a letter-separating apparatus, the combination of a hopper, a chute communicating with said hopper, a feed-roller between the chute and hopper, and separate channels under the chute.

8. In a letter-separator, the combination of a hopper, a chute communicating with said hopper, a feed-roller between the chute and hopper, separate channels under the chute, and letter-agitators in the chute.

9. In a letter-separator, the combination of a hopper, a chute communicating with said hopper, a feed-roller between the chute and hopper, a yielding gate over the roller, separate channels under the chute, and letter-agitators over the channels, substantially as described and shown.

10. In a letter-separator, the combination of a chute, separate channels under the chute, and traveling conveyers in the channels.

11. In a letter-separator, the combination of a chute, separate channels under the chute, letter-agitators over the channels, and traveling conveyers under the channels.

12. In an automatic mail-stamping apparatus, a feeler for engaging the edge of the flap of the letter to be stamped, consisting of a rotary foot or disk provided with a suitable edge, by which it rotates along the edge of the aforesaid flap.

13. In combination with the feeler adapted to engage the edge of the flap of the passing letter, as set forth, a yielding plate, Y, pivoted in the letter-supporting bed and held normally in proximity to the aforesaid feeler, substantially as and for the purpose specified.

14. A yielding cushioning-frame for supporting the marker, composed of a cross-bar provided with a central hub and with slide extensions or bars at each end passing through guides secured to the sides of the marker-frame, a sliding standard connected to the marker-frame and passing through the hub of the cross-bar, a spring, and its adjusting-nut, the whole suitably mounted, substantially as herein described and shown.

In testimony that we claim the foregoing as our invention we have signed our names, in presence of two witnesses, this 31st day of January, 1885.

GEORGE W. HEY.
EMIL LAASS.

Witnesses:
JAMES TURK,
SAML. R. BETTS.